(12) United States Patent
Sharma et al.

(10) Patent No.: US 11,455,031 B1
(45) Date of Patent: Sep. 27, 2022

(54) IN-FIELD ILLUMINATION FOR EYE TRACKING

(71) Applicant: Meta Platforms Technologies, LLC, Menlo Park, CA (US)

(72) Inventors: Robin Sharma, Redmond, WA (US); Andrew John Ouderkirk, Redmond, WA (US); Matthew E. Colburn, Woodinville, WA (US); Qi Zhang, Bellevue, WA (US); Giuseppe Calafiore, Redmond, WA (US); John Goward, Redmond, WA (US); Karol Constantine Hatzilias, Kenmore, WA (US); Matthieu Charles Raoul Leibovici, Seattle, WA (US); Nihar Ranjan Mohanty, Redmond, WA (US); Selso Luanava, Woodinville, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 25 days.

(21) Appl. No.: 15/997,473

(22) Filed: Jun. 4, 2018

(51) Int. Cl.
*G06F 3/01* (2006.01)
*H04N 5/225* (2006.01)
(Continued)

(52) U.S. Cl.
CPC .......... *G06F 3/013* (2013.01); *G02B 19/009* (2013.01); *G02B 19/0009* (2013.01); *H04N 5/2256* (2013.01); *G02B 27/0172* (2013.01); *G02B 2027/0138* (2013.01); *G02B 2027/0178* (2013.01)

(58) Field of Classification Search
CPC .......... G06F 3/013; G06F 3/011; G06F 3/044; G06F 3/04847; G06F 2203/0339; G06F 2203/04108; G02B 19/009; G02B 2027/0138; G02B 2027/0178; G02B 27/0172; G02B 19/0009;
(Continued)

(56) References Cited

U.S. PATENT DOCUMENTS

| 5,815,741 A | 9/1998 | Okuyama et al. |
| 6,064,752 A | 5/2000 | Rozmus et al. |

(Continued)

FOREIGN PATENT DOCUMENTS

| CN | 112470163 A | 3/2021 |
| EP | 3797376 A1 | 3/2021 |
| WO | 2019226187 | 11/2019 |

OTHER PUBLICATIONS

U.S. Appl. No. 16/033,099, "Non-Final Office Action", dated Oct. 15, 2019, 11 pages.
(Continued)

*Primary Examiner* — Nelson M Rosario
(74) *Attorney, Agent, or Firm* — Weaver Austin Villeneuve & Sampson LLP

(57) ABSTRACT

Disclosed herein are techniques for eye illumination for eye position tracking. An illuminator for eye tracking includes a substrate configured to be placed in front of an eye of a user and a light source positioned on a surface of the substrate. The light source is configured to be positioned within a field of view of the eye of the user. A maximum dimension of the light source in a plane parallel to an emission surface of the light source is less than 500 μm.

20 Claims, 12 Drawing Sheets

(51) Int. Cl.
*G02B 19/00* (2006.01)
*G02B 27/01* (2006.01)

(58) Field of Classification Search
CPC ......... G02B 2027/0118; H04N 5/2256; G09G 5/10; G09G 2320/0626; G09G 2354/00
See application file for complete search history.

(56) References Cited

U.S. PATENT DOCUMENTS

| | | | | |
|---|---|---|---|---|
| 6,354,504 B1* | 3/2002 | Sabourault | ......... | G06K 7/10732 |
| | | | | 235/454 |
| 7,519,287 B2 | 4/2009 | Mok et al. | | |
| 9,335,548 B1 | 5/2016 | Cakmakci et al. | | |
| 9,759,913 B2 | 9/2017 | Saarikko et al. | | |
| 10,495,879 B1* | 12/2019 | Ahuja | ................. | G02B 27/0172 |
| 10,788,892 B2 | 9/2020 | Sharma et al. | | |
| 2010/0188638 A1 | 7/2010 | Eberl et al. | | |
| 2012/0228646 A1 | 9/2012 | Kuo et al. | | |
| 2013/0099675 A1 | 4/2013 | Ma et al. | | |
| 2013/0114850 A1* | 5/2013 | Publicover | ......... | G06K 9/00604 |
| | | | | 382/103 |
| 2014/0340390 A1* | 11/2014 | Lanman | ............... | H04N 13/344 |
| | | | | 345/419 |
| 2014/0375789 A1* | 12/2014 | Lou | .................... | G02B 27/0172 |
| | | | | 348/78 |
| 2015/0097947 A1* | 4/2015 | Hudman | ................. | G01S 17/89 |
| | | | | 348/136 |
| 2015/0177514 A1* | 6/2015 | Maimone | ........... | G02B 27/0101 |
| | | | | 345/8 |
| 2015/0310670 A1 | 10/2015 | Grossinger | | |
| 2016/0019715 A1 | 1/2016 | Haddick et al. | | |
| 2016/0119612 A1 | 4/2016 | Wu et al. | | |
| 2016/0249801 A1 | 9/2016 | Gao | | |
| 2016/0352071 A1* | 12/2016 | Hogan | ...................... | H01S 5/40 |
| 2017/0138571 A1 | 5/2017 | Chen | | |
| 2017/0147859 A1 | 5/2017 | Zhang et al. | | |
| 2017/0242161 A1* | 8/2017 | Zhang | ................. | G09G 3/3406 |
| 2017/0316264 A1 | 11/2017 | Gustafsson et al. | | |
| 2018/0020137 A1 | 1/2018 | Engwall et al. | | |
| 2018/0136471 A1 | 5/2018 | Miller et al. | | |
| 2018/0196265 A1* | 7/2018 | Bouchier | ............. | G03H 1/2294 |
| 2018/0292896 A1* | 10/2018 | Hicks | ..................... | G09G 5/391 |
| 2019/0025930 A1 | 1/2019 | Fransson et al. | | |
| 2019/0265478 A1* | 8/2019 | Cok | ...................... | G06T 19/006 |
| 2019/0361523 A1 | 11/2019 | Sharma et al. | | |
| 2020/0355929 A1 | 11/2020 | Zhang et al. | | |
| 2020/0379561 A1 | 12/2020 | Sharma et al. | | |

OTHER PUBLICATIONS

International Application No. PCT/US2018/041842, "International Search Report and Written Opinion", dated Feb. 15, 2019, 11 pages.
U.S. Appl. No. 16/033,099, "Advisory Action", dated Mar. 25, 2020, 3 pages.
U.S. Appl. No. 16/033,099, "Notice of Allowance", dated May 20, 2020, 5 pages.
U.S. Appl. No. 16/033,099, "Final Office Action", dated Jan. 27, 2020, 12 pages.
U.S. Non-Final Office Action dated May 24, 2021 in U.S. Appl. No. 16/998,952.
EP Application No. 18919754.4, "Extended European Search Report", dated Jun. 9, 2021, 9 pages.
Final Office Action dated Oct. 8, 2021 for U.S. Appl. No. 16/998,952, filed Aug. 20, 2020, 14 pages.
Final Office Action dated Jun. 13, 2022 for U.S. Appl. No. 16/854,667, filed Apr. 21, 2020, 16 pages.
Li Z., et al., "Volume Holographic Spectral Imaging," Proceedings of SPIE—The International Society for Optical Engineering, 2005, 8 pages.
Non Final Office Action dated Mar. 4, 2022 for U.S. Appl. No. 16/854,667, filed Apr. 21, 2020, 14 pages.
Notice of Allowance dated Jan. 27, 2022 for U.S. Appl. No. 16/998,952, filed Aug. 20, 2020, 5 pages.
PCT Application No. PCT/US18/41842, "International Preliminary Report of Patentability", dated Nov. 24, 2020, 7 pages.

* cited by examiner

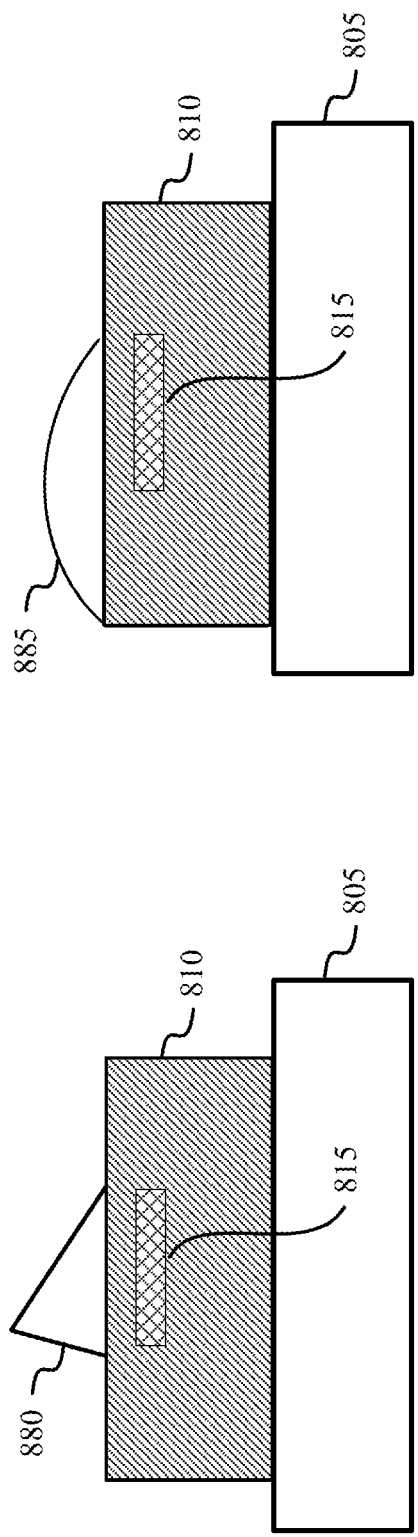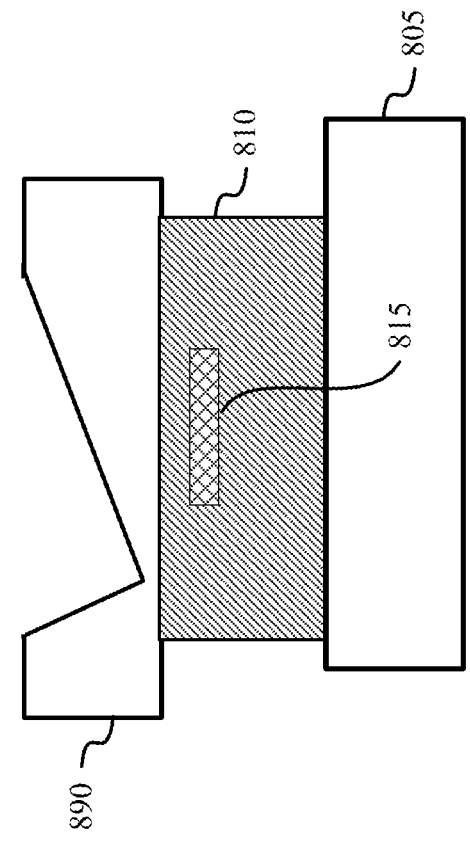

IN-FIELD ILLUMINATION FOR EYE TRACKING

BACKGROUND

An artificial reality system generally includes a display panel configured to present artificial images that depict objects in a virtual environment. The display panel may display virtual objects or combine real objects with virtual objects, as in virtual reality (VR), augmented reality (AR), or mixed reality (MR) applications. To interact with the artificial reality system, a user may need to provide inputs directed to at least a portion of the displayed image. Some artificial reality systems may include a dedicated input/output interface for receiving user inputs, such as hand and/or finger movements. However, traditional input/output interfaces may require frequent and active user inputs, and thus may prevent the user from having a fully immersive experience in the artificial reality environment.

An eye-tracking system can track the gaze of an artificial reality (e.g., VR/AR/MR) system so that the artificial reality system knows where the user is looking, and thus can provide a more immersive interface than a typical input/output interface predominantly reliant on a handheld peripheral input/output device. Eye-tracking may also be used for foveated imaging, foveated transmission of image data, alertness monitoring, etc. Existing eye-tracking systems may use light sources (e.g., infrared light) positioned at the periphery of the user's field of view to illuminate the eye, where the light illuminating the eye may be reflected specularly by the cornea of the user's eye, resulting in "glints" in a captured image of the eye. The position (e.g., gaze direction or rotation position) of the eye may be determined based on, for example, the location of the glints relative to a known feature of the eye (e.g., center of the pupil) in the captured image.

There may be several issues associated with existing eye tracking technologies. One of the issues is the size of the glints in the captured image for a light source that may not be a "point source." For example, an LED which may be used as the light source may have an emission area with a diameter of 200 µm or more. Thus, when the whole LED emission area is captured, the glint may not appear as a point in the captured image. Consequently, the center location of the glint in the image may not be precisely determined, and the errors in the approximation may lead to errors in the eye tracking result. In addition, the peripheral location of the light sources may negatively impact the accuracy of the eye tracking due to, for example, the large angles of the illuminating light from the light sources to the eye.

SUMMARY

The present disclosure generally relates to eye tracking in near-eye display devices. In some embodiments, an illuminator for eye tracking is provided. The illuminator includes a substrate configured to be placed in front of an eye of a user and a light source positioned on a surface of the substrate. The light source is configured to be positioned within a field of view of the eye of the user. A maximum dimension of the light source in a plane parallel to an emission surface of the light source is less than 500 µm.

An angle of an emission cone of the light from the light source may be less than 30°. The illuminator may also include a beam diverting component configured to direct light from the light source toward the eye of the user, such that at least a portion of the light is incident on the eye of the user at an angle with respect to a vector that is normal to a surface of the eye of the user. The beam diverting component may be a micro-prism, an inverse micro-prism, an off-axis micro-lens, a grating, or an inclined plane.

The illuminator may also include an encapsulation layer that surrounds the light source. A refractive index of the encapsulation layer matches a refractive index of the substrate. The substrate may include a conductive trace, and the light source may include an electrode that is electrically connected to the conductive trace. The illuminator may include a metal-loaded conductive adhesive that bonds the light source to the substrate.

The surface of the substrate may be flat. The substrate may include glass, quartz, plastic, polymer, ceramic, and/or crystal.

In some embodiments, an eye-tracking unit for a near-eye display device is provided. The eye-tracking unit includes a substrate configured to be placed in front of an eye of a user, a light source positioned on a surface of the substrate, and a camera configured to receive the light from the light source that is reflected by the eye of the user. The light source is configured to be positioned within a field of view of the eye of the user. A maximum dimension of the light source in a plane parallel to an emission surface of the light source is less than 500 µm.

An angle of an emission cone of the light from the light source may be less than 30°. The illuminator may also include a beam diverting component configured to direct light from the light source toward the eye of the user, such that at least a portion of the light is incident on the eye of the user at an angle with respect to a vector that is normal to a surface of the eye of the user. The beam diverting component may be a micro-prism, an inverse micro-prism, an off-axis micro-lens, a grating, or an inclined plane.

The illuminator may also include an encapsulation layer that surrounds the light source. A refractive index of the encapsulation layer matches a refractive index of the substrate. The substrate may include a conductive trace, and the light source may include an electrode that is electrically connected to the conductive trace. The illuminator may include a metal-loaded conductive adhesive that bonds the light source to the substrate.

The surface of the substrate may be flat. The substrate may include glass, quartz, plastic, polymer, ceramic, and/or crystal.

In some embodiments, a method of tracking an eye of a user of a near-eye display is provided. The method includes emitting light by a light source within a field of view of the eye of the user. A maximum dimension of the light source in a plane parallel to an emission surface of the light source is less than 500 µm. The method also includes directing, by a beam diverting component, the light toward the eye of the user, such that at least a portion of the light is incident on the eye of the user at an angle with respect to a vector that is normal to a surface of the eye of the user. Further, the method includes receiving, by a camera, light reflected by the eye of the user. The method may also include generating, by the camera using the received light reflected by the eye of the user, an image frame including an image of the light source reflected by the eye of the user.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 8A illustrates an example illuminator for eye tracking having a beam diverting component that is a microprism, according to certain embodiments;

FIG. 8B illustrates an example illuminator for eye tracking having a beam diverting component that is an off-axis micro-lens, according to certain embodiments;

FIG. 8C illustrates an example illuminator for eye tracking having a beam diverting component that is an inverse micro-prism, according to certain embodiments;

DETAILED DESCRIPTION

Figure 1:
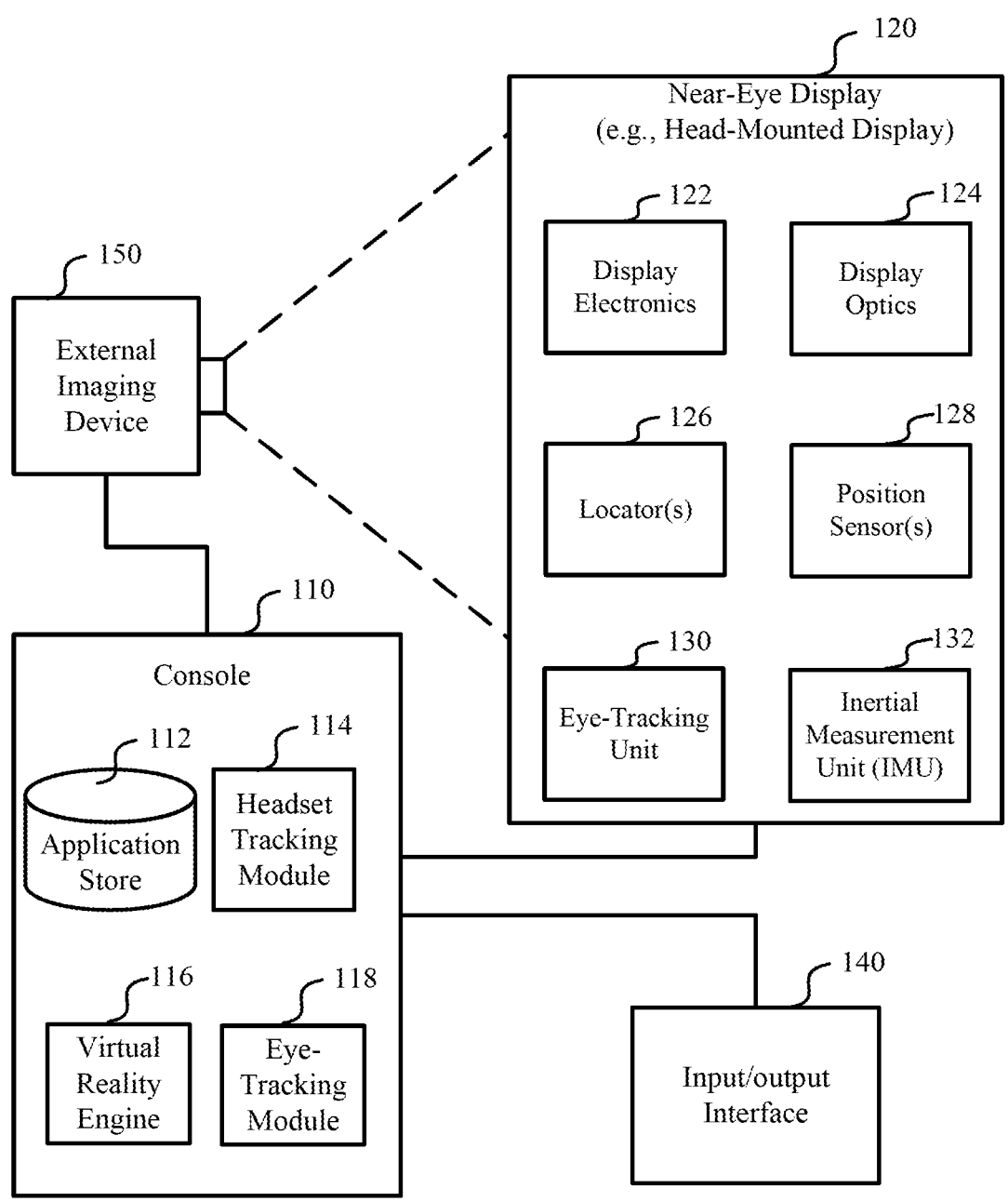
FIG. 1 is a simplified block diagram of an example artificial reality system environment including a near-eye display, according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

As used herein, visible light may refer to light with a wavelength between about 400 nm and about 750 nm. Near infrared (NIR) light may refer to light with a wavelength between about 750 nm and about 2500 nm. The desired infrared (IR) wavelength range may refer to the wavelength range of IR light that can be detected by a suitable IR sensor (e.g., a complementary metal-oxide semiconductor (CMOS) or a charge-coupled device (CCD) sensor), such as between 830 nm and 860 nm or between 930 nm and 980 nm.

As also used herein, a substrate may refer to a medium within which an array of chirped gratings may be inscribed. A chirped grating may refer to a grating whose pitch and angle of orientation changes over the extent of the grating. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to less than about 10 mm. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

An artificial reality system, such as a virtual reality (VR), augmented reality (AR), or mixed reality (MR) system, may include a near-eye display (e.g., a headset or a pair of glasses) configured to present content to a user via an electronic or optic display and, in some cases, may also include a console configured to generate content for presentation to the user and to provide the generated content to the near-eye display for presentation. To improve user interaction with presented content, the console may modify or generate content based on a location where the user is looking, which may be determined by tracking the user's eye. Tracking the eye may include tracking the position and/or shape of the pupil of the eye, and/or the rotational position (gaze direction) of the eye. To track the eye, the near-eye display may illuminate a surface of the user's eye using light sources mounted to or within the near-eye display, according to at least one embodiment. An imaging device (e.g., a camera) included in the vicinity of the near-eye display may then capture light reflected by various surfaces of the user's eye. Light that is reflected specularly off the cornea of the user's eye may result in "glints" in the captured image. One way to illuminate the eye to see the pupil as well as the glints is to use a two-dimensional (2D) array of light-emitting diodes (LEDs). According to embodiments of the invention, these LEDs may be placed within the user's field of view. Techniques such as a centroiding algorithm may be used to accurately determine the locations of the glints on the eye in the captured image, and the rotational position (e.g., the gaze direction) of the eye may then be determined based on the locations of the glints relative to a known feature of the eye (e.g., the center of the pupil) within the captured image.

Positioning a single light source or a plurality of light sources within the user's field of view may offer greater eye-tracking accuracy than positioning the light sources at the periphery of the user's field of view. For example, the probability of capturing glints over all gaze angles of the eye is higher when the light sources are located within the user's field of view. Further, the light sources may be configured such that they are effectively invisible to the user. This may be accomplished by using light sources with a very small form factor, such as less than 500 μm, less than 400 μm, or less than 200 μm. The form factor may refer to a maximum dimension of the light source in a plane that is parallel to an emission surface of the light source. A form factor of 200 μm may be a lower limit of what an eye is able to resolve. Alternatively, a form factor of 200 μm may be an upper limit of what is bothersome to the user when the light source is within the user's field of view. For example, a light source with a form factor of 200 μm may appear similar to a dust speck on the user's glasses, and may not interfere with the user's vision through the glasses. Some examples of light sources with a very small form factor are vertical cavity surface emitting lasers (VCSELs) that have a bare die size of less than 160 μm and an emission cone with an angle of less than 25°, and micro-LEDs that have a bare die size of less than 200 μm and an emission cone with an angle of less than 30°. The die size may refer to a linear dimension of the VCSEL or the micro-LED in a plane that is parallel to an emission surface of the VCSEL or the micro-LED. For example, the VCSEL or the micro-LED may have a square shape within the plane that is parallel to the emission surface, such that each of the sides of the square has a linear dimension of less than 200 μm. Further, positioning the light sources within the user's field of view may offer greater flexibility in the placement and distribution of the light sources, such that the amount of light captured by the camera is maximized. Although the eye may be able to detect near infrared light from a light source that is very bright, the light sources may be operated at lower brightness levels to minimize this effect.

FIG. 1 is a simplified block diagram of an example artificial reality system environment 100 including a near-eye display 120, in accordance with certain embodiments. Artificial reality system environment 100 shown in FIG. 1 may include a near-eye display 120, an external imaging device 150, and an input/output interface 140 that are each coupled to a console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to FIGS. 2, 3, and 11. Additionally, in various embodiments, the functionality described herein may be used in a headset that combines images of an environment external to near-eye display 120 and content received from console 110, or from any other console generating and providing content to a user. Therefore, near-eye display 120, and methods for eye tracking described herein, may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, one or more locators 126, one or more position sensors 128, an eye-tracking unit 130, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display images to the user according to data received from console 110. In various embodiments, display electronics 122 may include one or more display panels, such as a liquid crystal display (LCD), an organic light emitting diode (OLED) display, a micro-LED display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include sub-pixels to emit light of a predominant color such as red, green, blue, white, or yellow. In some implementations, display electronics 122 may display a 3D image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), or magnify image light received from display electronics 122, correct optical errors associated with the image light, and present the corrected image light to a user of near-eye display 120. In various embodiments, display optics 124 may include one or more optical elements. Example optical elements may include a substrate, optical waveguides, an aperture, a Fresnel lens, a convex lens, a concave lens, a filter, or any other suitable optical element that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. In some embodiments, display optics 124 may have an effective focal length larger than the spacing between display optics 124 and display electronics 122 to magnify image light projected by display electronics 122. The amount of magnification of image light by display optics 124 may be adjusted by adding or removing optical elements from display optics 124.

Display optics 124 may be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism. In some embodiments, content provided to display electronics 122 for display may be pre-distorted, and display optics 124 may correct the distortion when it receives image light from display electronics 122 generated based on the pre-distorted content.

Locators 126 may be objects located in specific positions on near-eye display 120 relative to one another and relative to a reference point on near-eye display 120. Console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

In some embodiments, locators 126 may be located beneath an outer surface of near-eye display 120. A portion of near-eye display 120 between a locator 126 and an entity external to near-eye display 120 (e.g., external imaging device 150, a user viewing the outer surface of near-eye display 120) may be transparent to the wavelengths of light emitted or reflected by locators 126 or is thin enough to not substantially attenuate the light emitted or reflected by locators 126. In some embodiments, the outer surface or other portions of near-eye display 120 may be opaque in the visible band, but is transparent in the IR band, and locators 126 may be under the outer surface and may emit light in the IR band.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more imaging devices configured to capture eye tracking data, which an eye-tracking module 118 in console 110 may use to track the user's eye. Eye tracking data may refer to data output by eye-tracking unit 130. Example eye tracking data may include images captured by eye-tracking unit 130 or information derived from the images captured by eye-tracking unit 130. Eye tracking may refer to determining an eye's position, including orientation and location of the eye, relative to near-eye display 120. For example, eye-tracking module 118 may output the eye's pitch and yaw based on images of the eye captured by eye-tracking unit 130. In various embodiments, eye-tracking unit 130 may measure electromagnetic energy reflected by the eye and communicate the measured electromagnetic energy to eye-tracking module 118, which may then determine the eye's position based on the measured electromagnetic energy. For example, eye-tracking unit 130 may measure electromagnetic waves such as visible light, infrared light, radio waves, microwaves, waves in any other part of the electromagnetic spectrum, or a combination thereof reflected by an eye of a user.

Eye-tracking unit 130 may include one or more eye-tracking systems. An eye-tracking system may include an imaging system to image one or more eyes and may optionally include a light emitter, which may generate light that is directed to an eye such that light reflected by the eye may be captured by the imaging system. For example, eye-tracking unit 130 may include a coherent light source (e.g., a VCSEL) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

In some embodiments, eye-tracking unit 130 may include one light emitter and one camera to track each of the user's eyes. In other embodiments, eye-tracking unit 130 may include a plurality of light emitters and one camera to track each of the user's eyes. Eye-tracking unit 130 may also include different eye-tracking systems that operate together to provide improved eye tracking accuracy and responsiveness. For example, eye-tracking unit 130 may include a fast eye-tracking system with a fast response time and a slow eye-tracking system with a slower response time. The fast eye-tracking system may frequently measure an eye to capture data used by eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking unit 130 may be configured to estimate the orientation of the user's eye. The orientation of the eye may correspond to the direction of the user's gaze within near-eye display 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically. Because the foveal axis is defined according to the fovea, which is located in the back of the eye, the foveal axis may be difficult or impossible to measure directly in some eye tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking unit 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking unit may also be detected. Translation of this type may occur, for example, due to a shift in the position of near-eye display 120 on a user's head. Eye-tracking unit 130 may also detect the torsion of the eye and the rotation of the eye about the pupillary axis. Eye-tracking unit 130 may use the detected torsion of the eye to estimate the orientation of the foveal axis from the pupillary axis. Eye-tracking unit 130 may also track a change in the shape of the eye, which may be approximated as a skew or scaling linear transform or a twisting distortion (e.g., due to torsional deformation). Eye-tracking unit 130 may estimate the foveal axis based on some combinations of the angular orientation of the pupillary axis, the translation of the eye, the torsion of the eye, and the current shape of the eye.

In some embodiments, eye-tracking unit 130 may include multiple emitters or at least one emitter that can project a structured light pattern on all portions or a portion of the eye. The structured light pattern may be distorted due to the shape of the eye when viewed from an offset angle. Eye-tracking unit 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking unit 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking unit 130 can also estimate the pupillary axis, the translation of the eye, the torsion of the eye, and the current shape of the eye based on the image of the distorted structured light pattern captured by the camera.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect (or the nearest point between the two axes). The direction of the user's gaze may be the direction of a line passing through the point of convergence and the mid-point between the pupils of the user's eyes.

Eye-tracking unit 130 is further described below with respect to, for example, FIGS. 3-9.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, a virtual reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to VR engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

VR engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. VR engine 116 may also receive estimated eye position and orientation information from eye-tracking module 118. Based on the received information, VR engine 116 may determine content to provide to near-eye display 120 for presentation to the user. For example, if the received information indicates that the user has looked to the left, VR engine 116 may generate content for near-eye display 120 that mirrors the user's eye movement in a virtual environment. Additionally, VR engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking unit 130 may output eye-tracking data including images of the eye, and eye-tracking module 118 may determine the eye's position based on the images. For example, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, as described above, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light.

Figure 2:
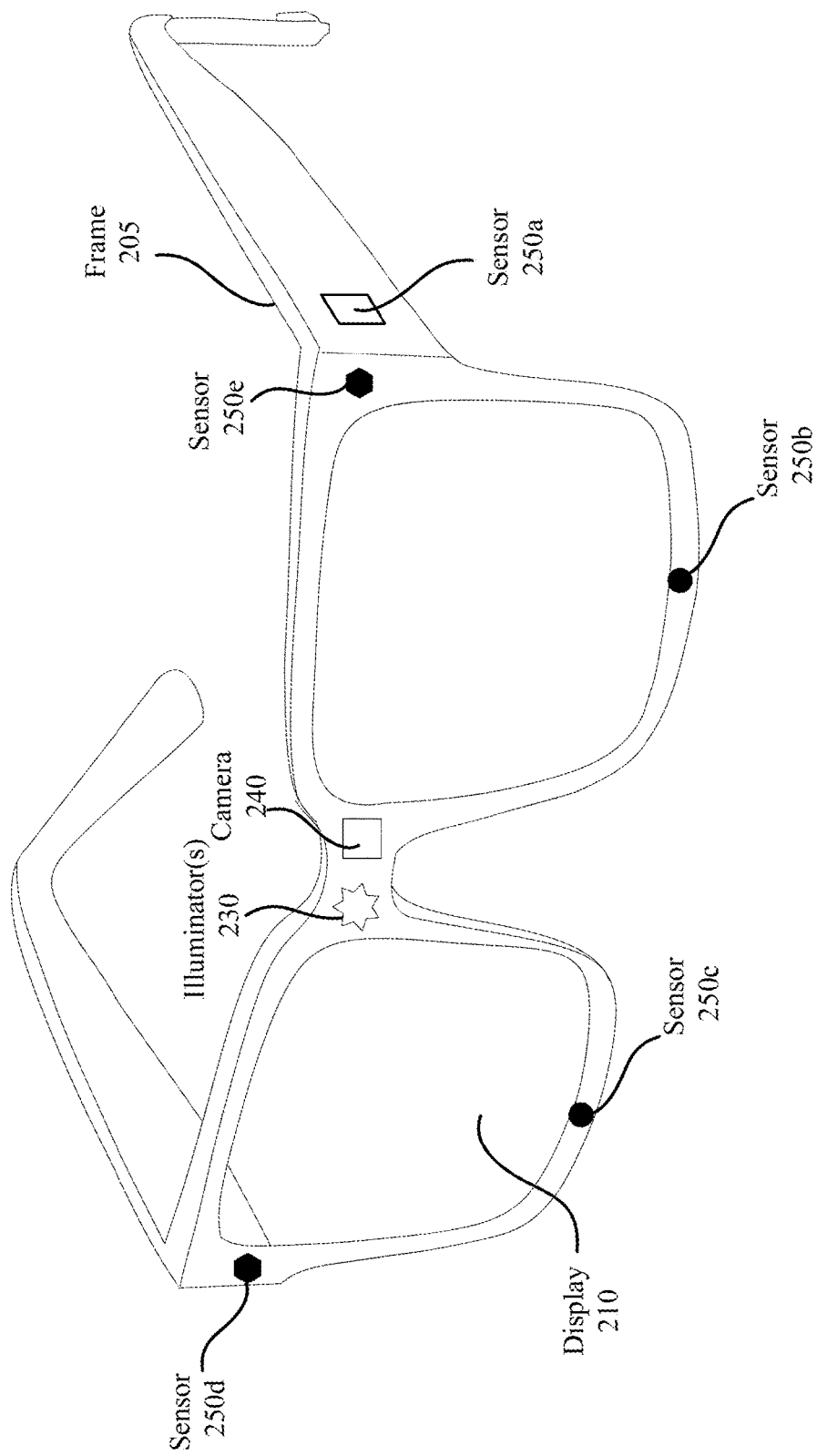
FIG. 2 is a perspective view of a simplified example near-eye display including various sensors.

FIG. 2 is a perspective view of a simplified example near-eye display 200 including various sensors. Near-eye display 200 may be a specific implementation of near-eye display 120 of FIG. 1, and may be configured to operate as a virtual reality display, an augmented reality display, and/or a mixed reality display. Near-eye display 200 may include a frame 205 and a display 210. Display 210 may be configured to present content to a user. In some embodiments, display 210 may include display electronics and/or display optics. For example, as described above with respect to near-eye display 120 of FIG. 1, display 210 may include an LCD display panel, an LED display panel, or an optical display panel (e.g., a waveguide display assembly).

Near-eye display 200 may further include various sensors 250a, 250b, 250c, 250d, and 250e on or within frame 205. In some embodiments, sensors 250a-250e may include one or more depth sensors, motion sensors, position sensors, inertial sensors, or ambient light sensors. In some embodiments, sensors 250a-250e may include one or more image sensors configured to generate image data representing different fields of views in different directions. In some embodiments, sensors 250a-250e may be used as input devices to control or influence the displayed content of near-eye display 200, and/or to provide an interactive VR/AR/MR experience to a user of near-eye display 200. In some embodiments, sensors 250a-250e may also be used for stereoscopic imaging.

In some embodiments, near-eye display 200 may further include one or more illuminators 230 to project light into the physical environment. The projected light may be associated with different frequency bands (e.g., visible light, infra-red light, ultra-violet light, etc.), and may serve various purposes. For example, illuminator(s) 230 may project light in a dark environment (or in an environment with low intensity of infra-red light, ultra-violet light, etc.) to assist sensors 250a-250e in capturing images of different objects within the dark environment. In some embodiments, illuminator(s) 230 may be used to project certain light pattern onto the objects within the environment. In some embodiments, illuminator(s) 230 may be used as locators, such as locators 126 described above with respect to FIG. 1.

In some embodiments, near-eye display 200 may also include a high-resolution camera 240. Camera 240 may capture images of the physical environment in the field of view. The captured images may be processed, for example, by a virtual reality engine (e.g., virtual reality engine 116 of FIG. 1) to add virtual objects to the captured images or modify physical objects in the captured images, and the processed images may be displayed to the user by display 210 for AR or MR applications.

Figure 3:
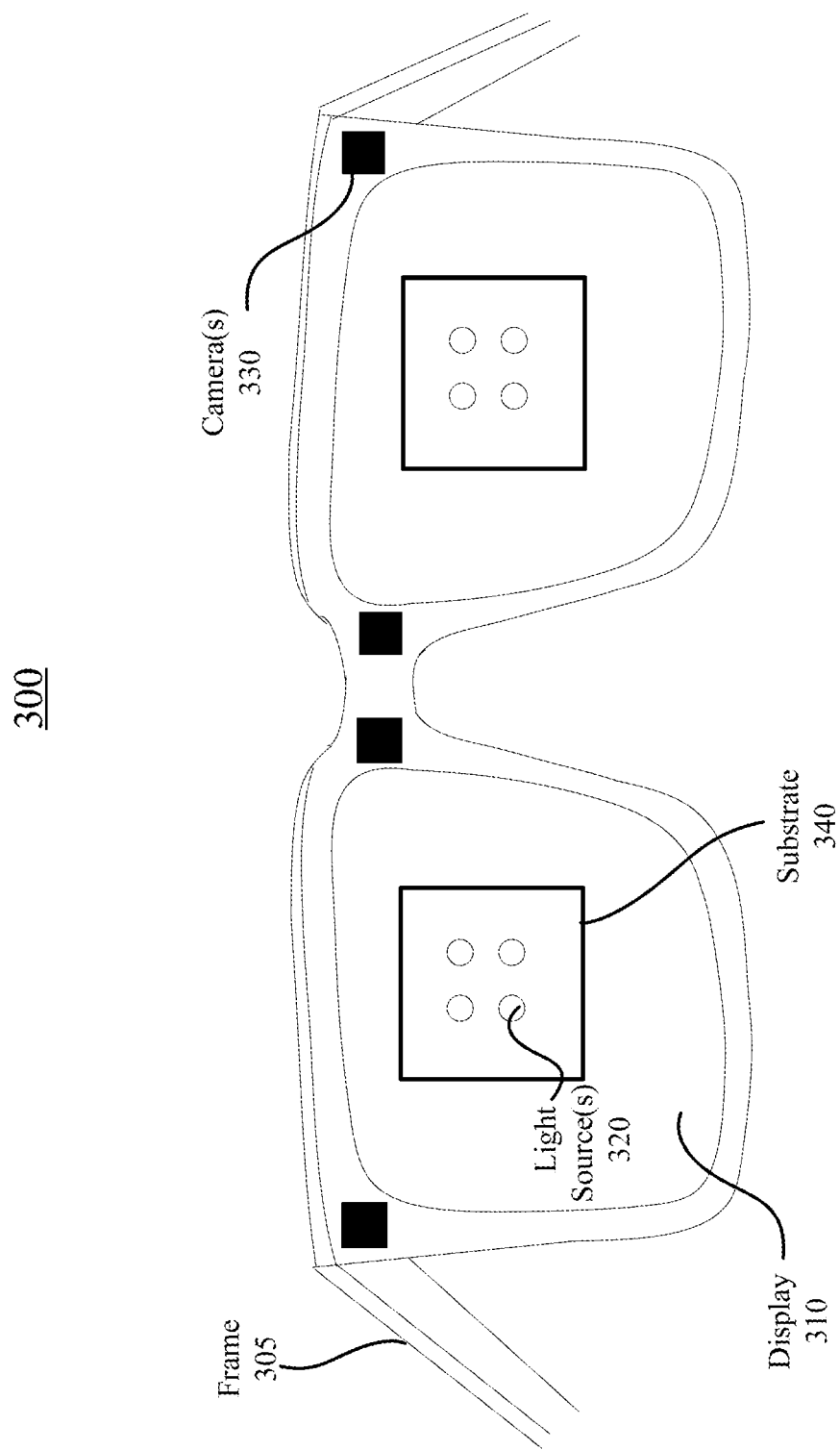
FIG. 3 is a perspective view of a simplified example near-eye display including an example eye-tracking unit.

FIG. 3 is a perspective view of a simplified example near-eye display 300 including an example eye-tracking unit. FIG. 3 may be the perspective view of near-eye display 300 viewed from the side that faces the eyes of the user. As near-eye display 200, near-eye display 300 may include a frame 305 and a display 310. Frame 305 may be coupled to or embedded with one or more electrical or optical components. Display 310 may include display electronics and/or display optics, and may be configured to present content to a user. For example, as described above, display 310 may include an LCD display panel, an LED display panel, and/or an optical display panel (e.g., a waveguide display assembly).

Near-eye display 300 may include one or more light sources 320 and one or more cameras 330. As discussed in further detail below, light source(s) 320 may be mounted on a substrate 340, such that light source(s) 320 are positioned within the field of view of the eye of the user. Any suitable number of light source(s) 320 may be used, and light source(s) 320 may be arranged in any suitable pattern, such as a one-dimensional array or a two-dimensional array. Light source(s) 320 may be spaced closer together or farther apart than shown in FIG. 3. Substrate 340 may be mounted in front of the display 310, or may be integrated with the display 310. Substrate 340 may be transparent to visible light. Camera(s) 330 may be coupled to or embedded in frame 305. Light source(s) 320 may emit light in certain frequency range (e.g., NIR) towards the eye of the user. The emitted light may be reflected by the eyes of the user. The reflected light may then be received by camera(s) 330 to form images that may indicate certain characteristics of light source(s) 320 and the eyes of the user. Based on the images captured by camera(s) 330, an eye's position, including the orientation and location of the eye, may be determined. The gaze direction and/or gaze point of the user may also be determined based on the detected eye's position as described above with respect to FIG. 1. The image content displayed on display 310 may then be adjusted accordingly based on the gaze direction and/or gaze point of the user.

Figure 4:
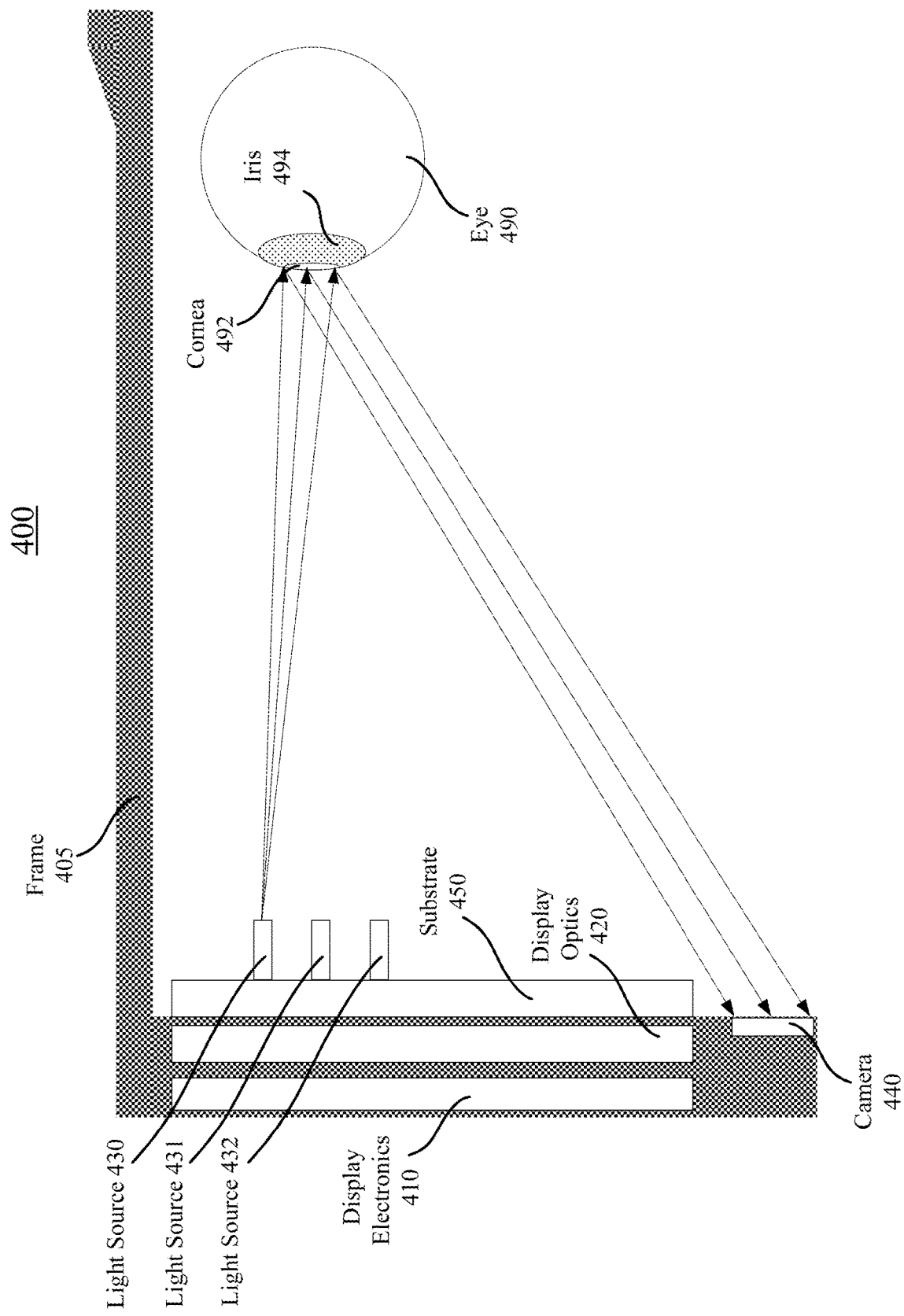
FIG. 4 is a cross-sectional view of an example near-eye display including an example eye-tracking unit.

FIG. 4 is a cross-sectional view of an example near-eye display 400 including an example eye-tracking unit. It is noted that, even though FIG. 4 and other figures in the present disclosure show an eye of a user of a near-eye display for illustration purposes, the eye of the user is not a part of the corresponding near-eye display. Like near-eye displays 200 and 300, near-eye display 400 may include a frame 405 and a display system that includes display electronics 410 and/or display optics 420 coupled to or embedded in frame 405. As described above with respect to display electronics 122, display electronics 410 may display images to the user according to data received from a console, such as console 110. Display electronics 410 may include sub-pixels to emit light of a predominant color, such as red, green, blue, white, or yellow. Display optics 420 may display image content optically (e.g., using optical waveguides and optical couplers), or magnify image light emitted by display electronics 410, correct optical errors associated with the image light, and present the corrected image light to the user of near-eye display 400. In various embodiments, display optics 420 may include one or more optical elements. Example optical elements may include a substrate, optical waveguides, optical couplers, an aperture, a Fresnel lens, a convex lens, a concave lens, a filter, or any other suitable optical element that may affect image light emitted from display electronics 410. Display optics 420 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Near-eye display 400 may include an eye-tracking unit that includes a light source 430 and a camera 440. Light source 430 may be mounted on substrate 450, which may be mounted on frame 450 in front of display optics 420. Substrate 450 may be transparent to visible light. Camera 440 may be coupled to or embedded in frame 405. Light source 430 may emit light towards an eye 490 of the user of near-eye display 400, and may be positioned within a field of view of eye 490. The emitted light may be reflected by the cornea 492 of eye 490 of the user. The reflected light may then be received by camera 440 to generate images that may indicate certain characteristics of light source 430 and eye 490 of the user. Based on the images captured by camera 440, the position of eye 490, including the orientation and location of eye 490, may be determined. The gaze direction and/or gaze point of the user may be determined based on the detected position of eye 490 as described above with respect to FIG. 1. The image content displayed on the display system may then be adjusted accordingly based on the gaze direction and/or gaze point of the user.

In some implementations, light source 430 may include a coherent light source (i.e., a light source emitting light at a precise wavelength with negligible phase difference), such as a VCSEL. The VCSEL may illuminate a portion of the surface of eye 490, such as cornea 492 or iris 494, with coherent light. For example, the VCSEL may emit light in the infrared spectrum having a wavelength between about 830 nm and about 860 nm. As another example, the VCSEL may emit light having a wavelength between about 900 nm and about 1160 nm, such as between about 930 nm and about 980 nm. Alternatively, the VCSEL may emit light having a wavelength in the visible spectrum. However, illuminating the eye with light in the infrared spectrum may reduce interference and noise from visible light emitted by display electronics 410 or from external visible light that passes into near-eye display 400, as in some augmented reality applications. The VCSEL may have a low power to prevent user discomfort or injury.

Although light source 430 may typically include a coherent light source, non-coherent light sources may be used in some implementations. For example, in some implementations, light source 430 may include an LED emitting light with wavelengths in the visible band or in the infrared band. For example, light source 430 may include a micro-LED. However, because LEDs emit light across a broader wavelength range than a laser, LEDs may produce images with lower contrast than those produced using a coherent light source. In some embodiments, an additional light source that emits light at a different wavelength than the light source may be used to increase eye-tracking precision.

Camera 440 may capture light reflected by the portion of the eye surface illuminated by light source 430. In one example, camera 440 may capture an image with a pixel array of 30 by 30 pixels, where a pixel may correspond to a resolution of about 15 to 40 µm of the eye surface. In this example, the imaged portion of the surface of eye 490 may have an area of between about 0.20 and about 1.44 square millimeters. In various embodiments, camera 440 may have increased resolution to increase eye tracking precision and accuracy. For example, camera 440 may have a quarter video graphic array (QVGA) resolution with a pixel array of 320×240 pixels. Increasing the number of pixels included in camera 440 may allow the size of the surface of eye 490 corresponding to a pixel to be decreased, allow the area of the surface of eye 490 imaged by camera 440 to be increased, or both. However, using fewer pixels may beneficially reduce the power consumption of camera 440, and illuminating and imaging a smaller area of the surface of the eye may beneficially reduce power consumption by light source 430. In some embodiments, camera 440 may include an optical mouse sensor or other sensor capturing images at a very high frame rate. For example, in some cases, camera 440 may capture about 5,000 images per second to provide precise eye tracking data.

As shown in FIG. 4, the eye tracking unit may also include additional light sources, such as light sources 431 and 432. Light sources 431 and 432 may be mounted on substrate 450. Like light source 430, light sources 431 and 432 may emit light towards eye 490, and may be positioned within the field of view of eye 490. The light emitted by light sources 431 and 432 may be reflected by cornea 492 of eye 490. The reflected light may then be received by camera 440 and included in the images discussed above. For example, glints from each of light sources 430, 431, and 432 may be included in some or all of the images, and may be used to determine the gaze direction and/or gaze point of the user. Light sources 431 and 432 may have characteristics similar to those described above for light source 430. For example, light sources 431 and 432 may include a VCSEL or a micro-LED. Although ray tracing is only shown in FIG. 4 for light source 430 for clarity of illustration, it should be understood that rays can also be traced to and from light sources 431 and 432.

Figure 5:
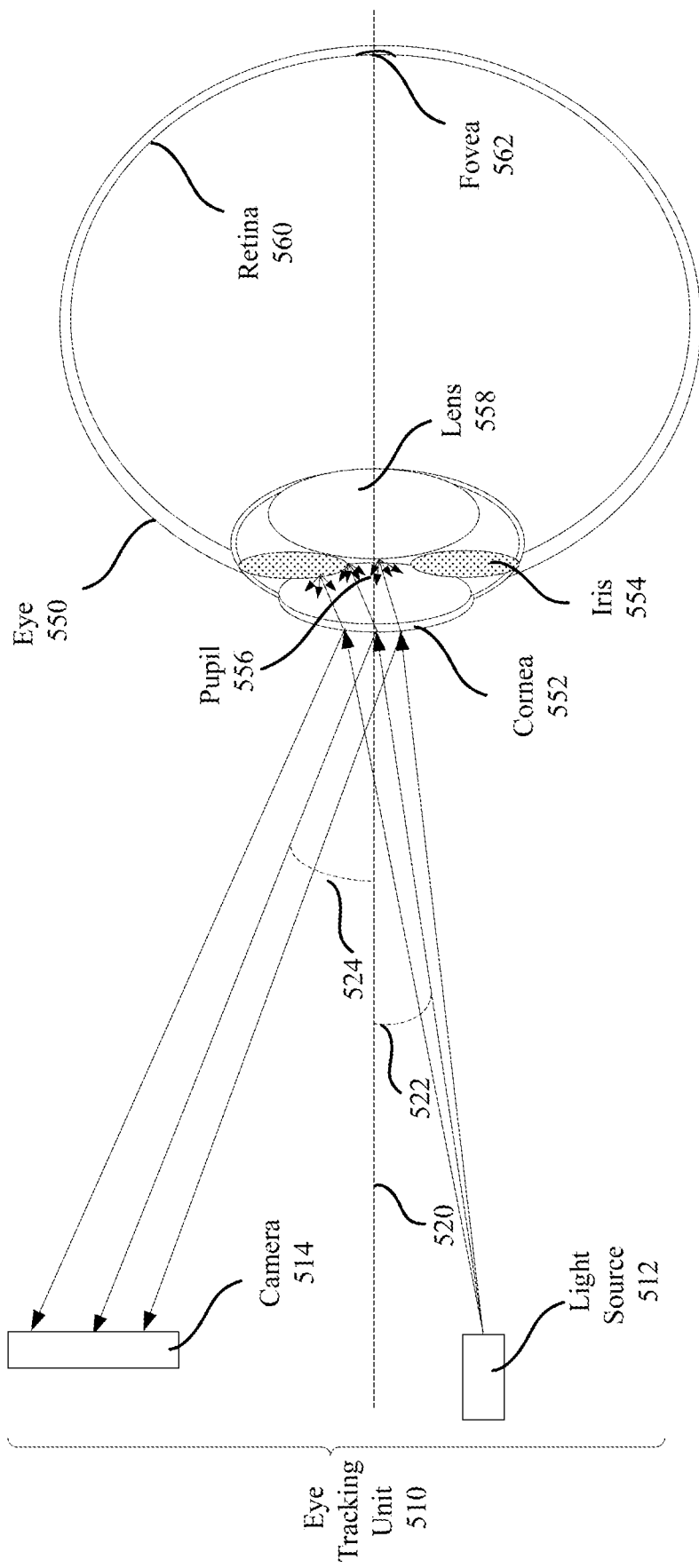
FIG. 5 illustrates light reflections and diffusions by an eye during eye tracking.

FIG. 5 illustrates light reflections and diffusions by an eye 550 during eye tracking using an eye-tracking unit 510. Eye-tracking unit 510 may include a light source 512 and a camera 514 as described above with respect to FIG. 4. Although only one light source 512 is shown in FIG. 5, it should be understood that multiple additional light sources may be placed within the field of view of eye 550. In other embodiments, eye-tracking unit 510 may include different and/or additional components than those depicted in FIG. 4. Light source 512 may include a VCSEL or a micro-LED and may emit light having a center axis that forms an angle 522 relative to a surface normal vector 520 of eye 550. As discussed in further detail below, a beam diverting component may be positioned proximate to an emission area of light source 512 in order to achieve a desired light output direction. Surface normal vector 520 is orthogonal to a portion of the surface (e.g., cornea 552) of eye 550 illuminated by light source 512. In the example shown in FIG. 5, surface normal vector 520 may be the same as the foveal axis (a line from the center of pupil 556 to fovea 562) of eye 550. Alternatively, surface normal vector 520 may be orthogonal to another portion of the surface of eye 550. Angle 522 may be measured between surface normal vector 520 and a line from a center of the portion of the surface of eye 550 illuminated by light source 512 to a center of the output aperture of light source 512. Angle 522 may be chosen to have any suitable value, such that at least a portion of the light from light source 512 is reflected by eye 550 and received by camera 514. For example, angle 522 may be chosen to be close to zero (e.g., between 5° and 10°) in order to minimize any distortions caused by larger incident angles, but greater than zero to prevent the light from being reflected directly back at light source 512 by eye 550. Although not shown, various reflectors and/or other optical components may be used to direct light reflected by eye 550 toward camera 514. For example, a plurality of reflectors (e.g., dichroic mirrors such as hot mirrors) may be immersed in a transparent substrate that may be positioned within the field of view of eye 550. Each reflector may reflect light in a first band of the optical spectrum (e.g., IR light or NIR light) and transmit light in a second band of the optical spectrum (e.g., visible light).

Camera 514 may be mounted at a camera angle 524 relative to surface normal vector 520 of eye 550. Camera 514 may be mounted outside of the field of view of eye 550, such that camera 514 does not interfere with the user's perception of the scene. Camera angle 524 may be measured between surface normal vector 520 and a line from a center of the portion of the surface of eye 550 illuminated by light source 512 to a center of the image sensor or light input aperture of camera 514. In some embodiments, a difference between angle 522 and camera angle 524 may be less than a threshold amount so that camera 514 may capture images via specular reflections of light incident on cornea 552 of eye 550, which may beneficially increase contrast of the resulting image and minimize light power loss and power consumption.

The light emitted by light source 512 may substantially uniformly illuminate a portion of the eye surface (e.g., cornea 552). A portion of the emitted light may be reflected specularly by cornea 552 of eye 550 and captured by camera 514. In some cases, the light incident on eye 550 may propagate into the eye for a small distance before being reflected. At least some portions of the light may enter eye 550 through cornea 552 and reach iris 554, pupil 556, lens 558, or retina 560 of eye 550. Because the eye surface and the interfaces within eye 550 (e.g., surface of iris 554 or pupil 556) may be rough (e.g., due to features such as capillaries or bumps), the eye surface and the interfaces within eye 550 may scatter the incident light in multiple directions. Different portions of the eye surface and the interfaces within eye 550 may have different arrangements of features. Thus, an intensity pattern of the light reflected by eye 550 may depend on the arrangement of features within the illuminated portion of eye 550, which may allow identification of the portion of the eye from the intensity pattern.

Camera 514 may collect and project light reflected by the illuminated portion of eye 550 onto an image sensor of camera 514. Camera 514 may also correct one or more optical errors (such as those described with respect to the display optics 124) to improve the contrast and other properties of the images captured by the image sensor of camera 514. In some embodiments, camera 514 may also magnify the reflected light. In some embodiments, camera 514 may enlarge the images. The image sensor of camera 514 may capture incident light focused by a lens assembly of camera 514. Thus, camera 514 may effectively capture an image of light source 512 (the emitted light of which is reflected specularly by the cornea of the eye) reflected by the eye, resulting in a "glint" in the captured image. Because of the scattering (diffusive reflections) at the eye surface and internal interfaces of the eye, light incident on a point of the image sensor may include light reflected from multiple points within the illuminated portion of eye 550, and thus may be the result of the interference of the light reflected from the multiple points. Thus, the image sensor of camera 514 may also capture a diffraction or speckle pattern formed by a combination of light reflected from multiple points of the surface of eye 550.

Each pixel of the image sensor may include a light-sensitive circuit that can output a current or voltage signal proportional to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 514 may include a complementary metal-oxide semiconductor (CMOS) pixel array, which may be used with light having a wavelength less than about 850 nm. As another example, the image sensor of camera 514 may include an indium gallium arsenide (InGaAs) alloy pixel array. Such an image sensor may be used with light having a wavelength between about 900 nm and about 1160 nm.

In some embodiments, to determine a position change of eye 550, an eye-tracking module (e.g., eye-tracking module 118 of FIG. 1) may determine a pixel shift between images. Multiplying the pixel shift by a calibrated distance per pixel may allow the eye-tracking module to determine a distance the surface (e.g., cornea 552) of eye 550 has shifted. For example, if the glint captured in one image is shifted by two pixels relative to the glint captured in a previous image, and each pixel corresponds to a distance of 10 µm at the surface of eye 550, the surface of eye 550 may have moved about 20 µm.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 550. For example, the eye-tracking module may determine the eye position by retrieving a reference eye position associated with the feature (which was also captured in a reference image), determining a pixel shift between the feature in the captured image and the feature in the reference image, and determining the eye position by modifying the reference eye position according to the determined pixel shift using the calibrated distance per pixel as described above.

As discussed above, camera 514 may effectively capture an image of light source 512 reflected by cornea 552 of eye 550. In some cases, the light source may be an extended source rather than a point source. Thus, the captured image (i.e., glint) of light source 512 may have a shape of a circle, a rectangle, an oval, or an irregular shape, and the spatial structure of light source 512 may be captured in the image. The extended shape of the glint and/or the spatial structure captured in the image of the light source may cause errors when determining the relative location of the glint in the image using, for example, the centroiding algorithm. The errors may affect the accuracy of eye tracking when the relative location (e.g., pixel shift) of the glint in the image is used to determine the corneal location in 3D space. Therefore, the light source 512 may have an emission area with a small form factor that is much less than 200 µm. The small emission area of a VCSEL or a micro-LED would appear more like a point source than an extended source in the image and reduce the size of the resulting glint on the captured image. A VCSEL or a micro-LED that has a bare die size less than 200 µm would have an emission area with a linear dimension that is significantly smaller than 200 µm because the emission area of the VCSEL or micro-LED is much smaller than the bare die size in order to accommodate other components, such as the bond part. For example, a diameter of the emission area may be less than 20 µm. A smaller glint size in the captured image may lead to a more precise glint location determination and more accurate eye tracking.

According to certain aspects of the present disclosure, a light source or a plurality of light sources may be mounted on a transparent substrate that can be positioned in front of the user, such that the light source or plurality of light sources are within the user's field of view. The light source or plurality of light sources may be used for illumination and imaging in eye tracking. A beam diverting component may be provided for each light source, in order to direct light from the light source toward the eye of the user. The beam diverting component may cause at least a portion of the light from the light source to be incident on the eye of the user at an angle with respect to a vector that is normal to a surface of the eye of the user.

Because visible light is allowed to pass through the substrate, the substrate can be positioned in front of the user's eyes without obstructing the user's field of view. For example, in an AR application, the user can look through the substrate to see the outside world. In a VR application, the user can look through the substrate to view the displayed content. At the same time, light from a light source for eye illumination may be directed to the user's eye (e.g., cornea), and may then be reflected by the eye to a camera to form the glints in images captured by the camera for eye tracking.

Figure 6:
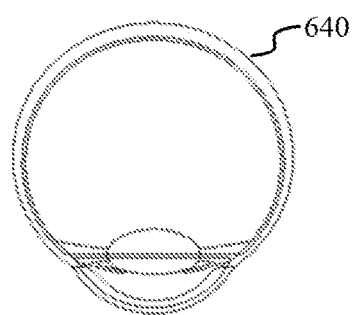
FIG. 6 is a simplified diagram of an example illuminator for eye tracking in an example near-eye display, according to certain embodiments.
Figure 6:
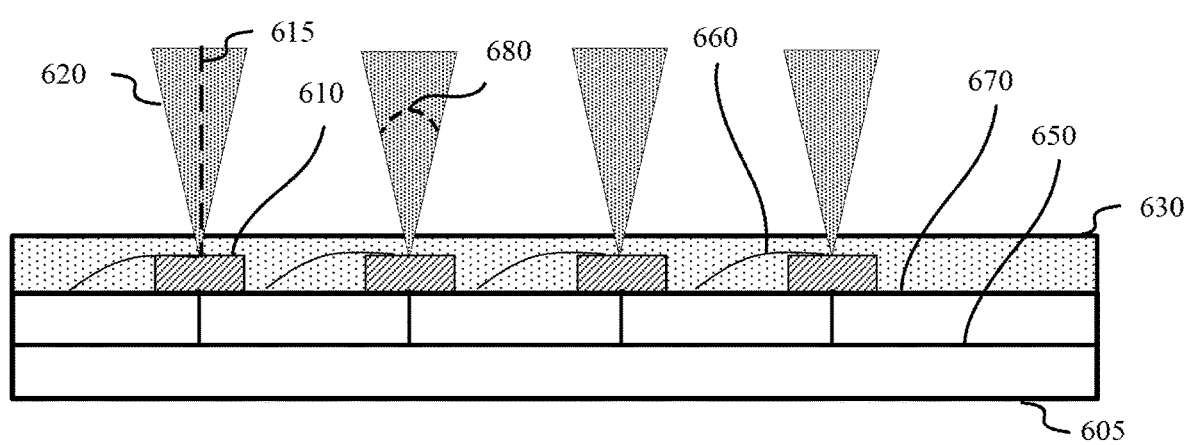

FIG. 6 is a simplified diagram illustrating an example illuminator 600 for eye tracking in an example near-eye display, according to certain embodiments. FIG. 6 is merely illustrative and is not drawn to scale. Illuminator 600 may include a substrate 605 that positioned in front of (e.g., at a distance of about 10-20 mm from) a user's eye 640 and within the field of view of user's eye 640. Substrate 605 may include one or more types of dielectric materials, such as glass, quartz, plastic, polymer, PMMA, crystal, or ceramic, and may be transparent to, for example, both visible light and NIR light. In some implementations, substrate 605 may be a part of glasses of the near-eye display or a part of display optics described above. Substrate 605 may have a thickness less than about 10 mm, and may have any suitable shape, such as cuboidal, or may have a curved surface. For example, a surface 670 of substrate 605 may be flat or curved. Further, some or all of substrate 605 may be coated with a conductive material that may or may not be transparent to visible light. The conductive material may include any suitable conductor, such as graphene or a transparent conductive oxide.

As shown in FIG. 6, a plurality of light sources 610 may be mounted on substrate 605. For example, light sources 610 may be LEDs, micro-LEDs, inorganic LEDs, OLEDs, or VCSELs. Light sources 610 may be attached to substrate 605 in any suitable manner, such as bonding, gluing, or soldering. For example, light sources 610 may be die-bonded to substrate 605 using metal-loaded conductive adhesives. Further, light sources 610 may be wire-bonded to the conductive coating on surface 670 of substrate 605 via wire 660. In addition, electrodes of light sources 610 may be electrically connected to a conductive circuit trace 650 within substrate 605. Conductive circuit trace 650 may be used to control the activity of light sources 610. Although a plurality of light sources 610 are shown in FIG. 6, other embodiments of the illuminator 600 may have a single light source 610. Further, the plurality of light sources 610 may be arranged in a one-dimensional line or a two-dimensional array.

Each light source 610 emits light having an emission cone 620 whose axis is normal to a top surface of the light source 610. For example, each light source 610 may be a VCSEL having an emission cone 620 with an angle 680 of less than 25° or a micro-LED having an emission cone 620 with an angle 680 of less than 30°. Light sources 610 may be surrounded by or immersed in an encapsulation layer 630 that is an index matched layer, such that a refractive index of encapsulation layer 630 matches a refractive index of substrate 605. Encapsulation layer 630 may protect light sources 610 from damage.

As shown in FIG. 6, an axis 615 of each emission cone 620 is normal to the top surface of light source 610 and substrate 605. As a result, light from some light sources 610 may not be angled directly toward eye 640. This may cause some or all of the light from light sources 610 to be wasted by not reaching eye 640. This may be especially problematic for light sources 610 that are positioned near the outer edges of substrate 605, due to the narrow angle 680 of emission cone 620. Some embodiments may address this issue by making surface 670 of substrate 605 curved. However, it may be difficult to bond light sources 610 on a curved surface.

Figure 7:
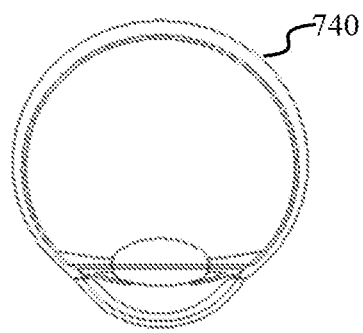
FIG. 7 is a simplified diagram illustrating an example illuminator for eye tracking in an example near-eye display, according to certain embodiments.
Figure 7:
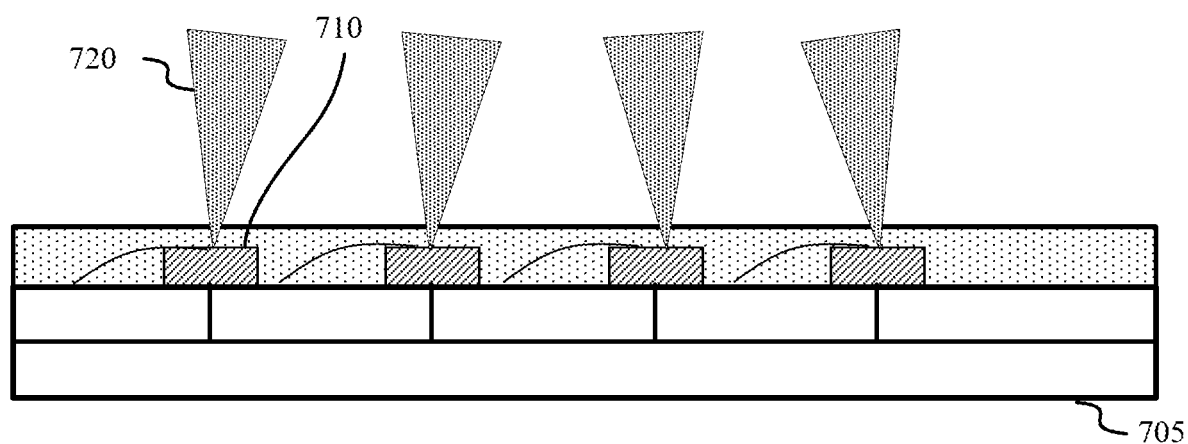

FIG. 7 is a simplified diagram illustrating an example illuminator 700 for eye tracking in an example near-eye display, according to certain embodiments. FIG. 7 is merely illustrative and is not drawn to scale. The elements shown in FIG. 7 are similar to those shown in FIG. 6, except that each light source 710 is provided with a beam diverting component (not shown in FIG. 7) that directs light from the light source 710 toward eye 740. The beam diverting components for light sources 710 near the outer edges of substrate 705 may be configured to bend the light at a larger angle, in order to direct the light toward eye 740. Alternatively, some or all of the beam diverting components may bend the light at the same angle, such as an array of light sources that are arranged in a circle whose center is aligned with a center of eye 740. The beam diverting components are further described below with respect to FIGS. 8A-8E.

The distribution of the light emitted from light sources 710 and directed by the beam diverting components toward eye 740 may be controlled by the beam diverting components. For example, each beam diverting component may direct the light from a respective light source 710 in a different direction and may illuminate a different area on eye 740, depending on the location of light source 710 and the angle at which the beam diverting component bends the light. For example, as discussed above, the beam diverting components for light sources 710 near the outer edges of substrate 705 may be configured to bend the light at a larger angle, while the beam diverting components for light sources 710 near the middle of substrate 705 (i.e., closest to a normal vector of eye 740) may be configured to bend the light at a smaller angle. Because each light source 710 may have a narrow emission cone, the beam diverting components may prevent some or all of the light from missing the target location. Further, each area of eye 740 may be illuminated approximately uniformly by light sources 710. Using multiple light sources 710 may allow multiple glints to be generated, which may improve eye-tracking accuracy.

FIGS. 8A-8E are simplified diagrams illustrating example illuminators for eye tracking having various beam diverting components, according to certain embodiments. FIGS. 8A-8E are merely illustrative and are not drawn to scale. As shown in FIGS. 8A-8E, a light source 810 having an emission area 815 is mounted on a substrate 805. Beam diverting components 880, 885, 890, 895, and 898 may change the direction of light from emission area 815. For example, light source 810 may be configured such that emission area 815 emits light normal to substrate 805. However, beam diverting components may change the direction of the light, such that the light is directed toward an eye of the user. For example, beam diverting components 880, 885, 890, 895, and 898 may bend the light such that at least a portion of the light is incident on the eye at an angle with respect to a vector that is normal to a surface of the eye. As discussed above, the angle may be selected such that at least some of the light is reflected by the eye and is incident on the camera. Alternatively, beam diverting components 880, 885, 890, 895, and 898 may bend the light such that more of the light is incident on the surface of the eye.

FIG. 8A illustrates an example illuminator for eye tracking having beam diverting component 880 that is a micro-prism, according to certain embodiments. A shape and a position of the micro-prism may be adjusted to customize the angle at which the light from emission area 815 is bent. The micro-prism may be incorporated into the illuminator and aligned with light source 810 by any suitable method. For example, the micro-prism or an array of micro-prisms may be molded from a substrate, and then the micro-prism may be placed on light source 810 and aligned with emission area 815. Further, the micro-prism may be patterned into a substrate by grayscale lithography or photolithography. The micro-prism may also be deposited on light source 810 by pick-and-place deposition.

FIG. 8B illustrates an example illuminator for eye tracking having beam diverting component 885 that is an off-axis micro-lens, according to certain embodiments. A shape and a position of the micro-lens may be adjusted to customize the angle at which the light from emission area 815 is bent. The micro-lens may be incorporated into the illuminator and aligned with light source 810 by any suitable method. For example, the micro-lens or an array of micro-lenses may be molded from a substrate, and then the micro-lens may be placed on light source 810 such that an optical axis of the micro-lens is offset from an optical axis of emission area 815. In addition, the micro-lens may be formed by three-dimensional (3D) direct write lithography, injection molding, or inkjet printing. A flat metalens may be formed by nanoimprinting or optical lithography. Further, the micro-lens may be deposited on light source 810 by inkjet printing. The micro-lens may also be deposited on light source 810 by pick-and-place deposition.

FIG. 8C illustrates an example illuminator for eye tracking having beam diverting component 890 that is an inverse micro-prism, according to certain embodiments. A shape and a position of the inverse micro-prism may be adjusted to customize the angle at which the light from emission area 815 is bent. The inverse micro-prism may be incorporated into the illuminator and aligned with light source 810 by any suitable method. For example, the inverse micro-prism may be patterned into a substrate by grayscale lithography or photolithography, and may then be placed on light source 810 and aligned with emission area 815. Further, the inverse micro-prism may be formed by injection molding. In addition, the inverse micro-prism may be formed by diamond turning in an encapsulation layer that surrounds light source 810. The inverse micro-prism may also be deposited on light source 810 by pick-and-place deposition. For the illuminators shown in FIGS. 8A, 8B, and 8C, the light sources 810 and beam diverting components 880, 885, and 890 may be immersed in an encapsulant (not shown), where the encapsulant may have a different refractive index than the beam diverting components 880, 885, and 890.

Figure 8E:
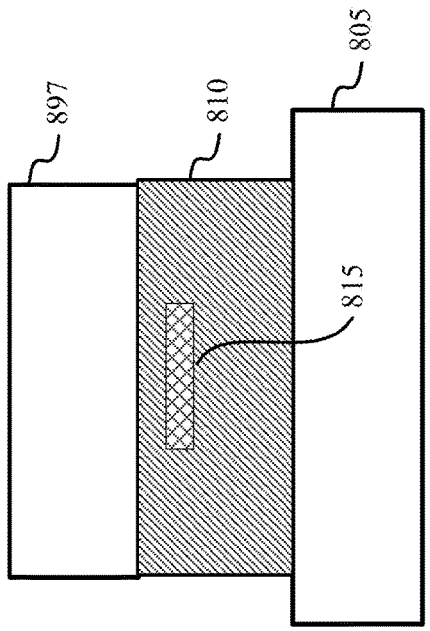
FIGS. 8D and 8E illustrate example illuminators for eye tracking having beam diverting components that are gratings, according to certain embodiments.
Figure 8F:
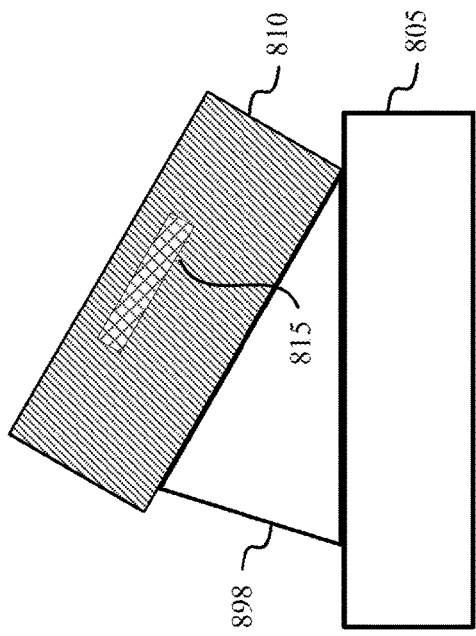
FIG. 8F illustrates an example illuminator for eye tracking having a beam diverting component that is an inclined plane, according to certain embodiments.
Figure 8D:
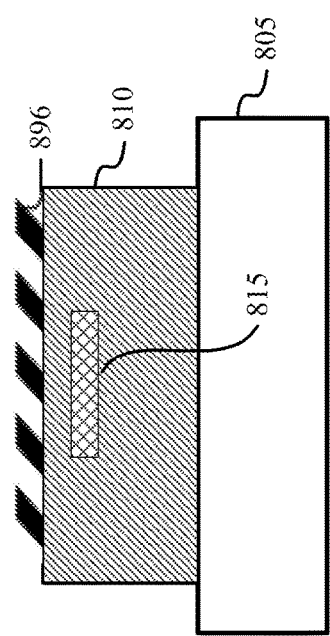

FIGS. 8D and 8E illustrate example illuminators for eye tracking having beam diverting components 895 and 897, respectively, that are gratings, according to certain embodiments. A period, slant angle, material(s), shape, and/or position of the grating may be adjusted to customize the angle at which the light from emission area 815 is bent. For example, a shorter grating period diffracts light at a larger angle and may be used on the outer edges of the grating. Slanted gratings increase the amount of light diffracted in the −1 or +1 diffraction order. The grating may be incorporated into the illuminator and aligned with light source 810 by any suitable method. For example, the grating may be formed in a substrate by etching and nanoimprinting, or by holography. Further, as shown in FIG. 8D, the grating may be a surface relief grating (SRG) 896 that is formed by direct imprinting on a surface of light source 810. In addition, the grating may be fabricated as a roll that forms an encapsulation layer on light source 810. The grating may also be a thin phase hologram of a thick volume Bragg grating 897, as shown in FIG. 8E.

FIG. 8F illustrates an example illuminator for eye tracking having beam diverting component 898 that is an inclined plane, according to certain embodiments. A shape and a position of the inclined plane may be adjusted to customize the angle at which the light from emission area 815 is bent. The inclined plane may be incorporated into the illuminator and aligned with light source 810 by any suitable method. For example, grayscale lithography may be used to pattern small bumps on a bottom surface of light source 810, such that a coefficient of friction is sufficient to prevent light source 810 from sliding off of the inclined plane. Alternatively, light source 810 may be mounted with solder bumps, where the bonding pads have different thicknesses, different amounts of solder is used, and/or light source 810 is held at a predetermined angle that is not parallel with the bonded surface of substrate 805.

Figure 9:
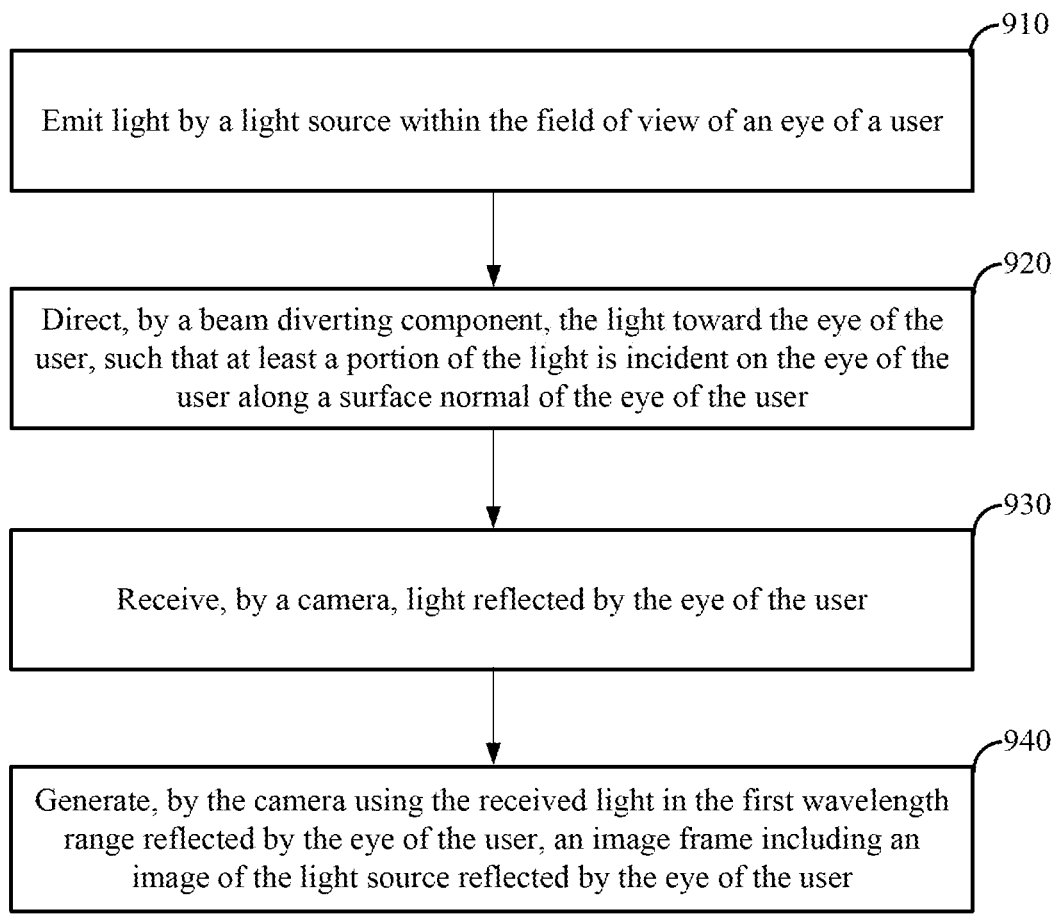
FIG. 9 is a flow chart illustrating an example method of eye illumination for eye tracking in a near-eye display, according to certain embodiments.

FIG. 9 is a flow chart 900 illustrating an example method of eye illumination for eye tracking in a near-eye display, according to certain embodiments. The method may be performed by, for example, eye-tracking unit 130 in near-eye display 120 of FIG. 1 and eye-tracking unit 510 of FIG. 5.

At block 910, a light source (e.g., a VCSEL or a micro-LED) of an eye-tracking unit in a near-eye display device may emit light. The light source may be within a field of view of an eye of a user. In order to prevent the user from perceiving or being affected by the presence of the light source, a maximum dimension of the light source in a plane parallel to an emission surface of the light source may be less than 200 μm. The light may be in the NIR region of the spectrum, such as between 830 nm and 860 nm, or between 930 nm and 980 nm. An angle of an emission cone of the light from the light source may be less than 30°.

At block 920, a beam diverting component may change the direction of the light from the light source in order to direct the light from the light source toward the eye of the user. For example, as discussed above, the beam diverting component, such as the beam diverting components 880, 885, 890, 896, 897, and 898 shown in FIGS. 8A, 8B, 8C, 8D, 8E, and 8F, respectively, may be designed such that at least a portion of the light is incident on the eye of the user at an angle with respect to a vector that is normal to a surface of the eye of the user. Other portions of the light may be incident on the eye of the user at other angles, or may not be incident on the eye of the user.

At block 930, a camera of the eye-tracking unit may receive light that is reflected by the eye of the user. The light reflected by the eye of the user may include light specularly reflected by the cornea of the eye and light diffusively reflected or diffracted by features within the eye, such as features on the iris or pupil of the eye.

At block 940, the camera may generate an image frame including an image of the light source (a "glint") reflected by the eye of the user, by detecting the light reflected from the eye of the user using an image sensor. In embodiments where multiple light sources are used, multiple glints may be captured in the captured image frame. The location(s) of the glint(s) in the captured image frame and/or other features in the captured image frame that correspond to features in different areas of the eye may then be used to determine a position of the user's eye as described above.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 10:
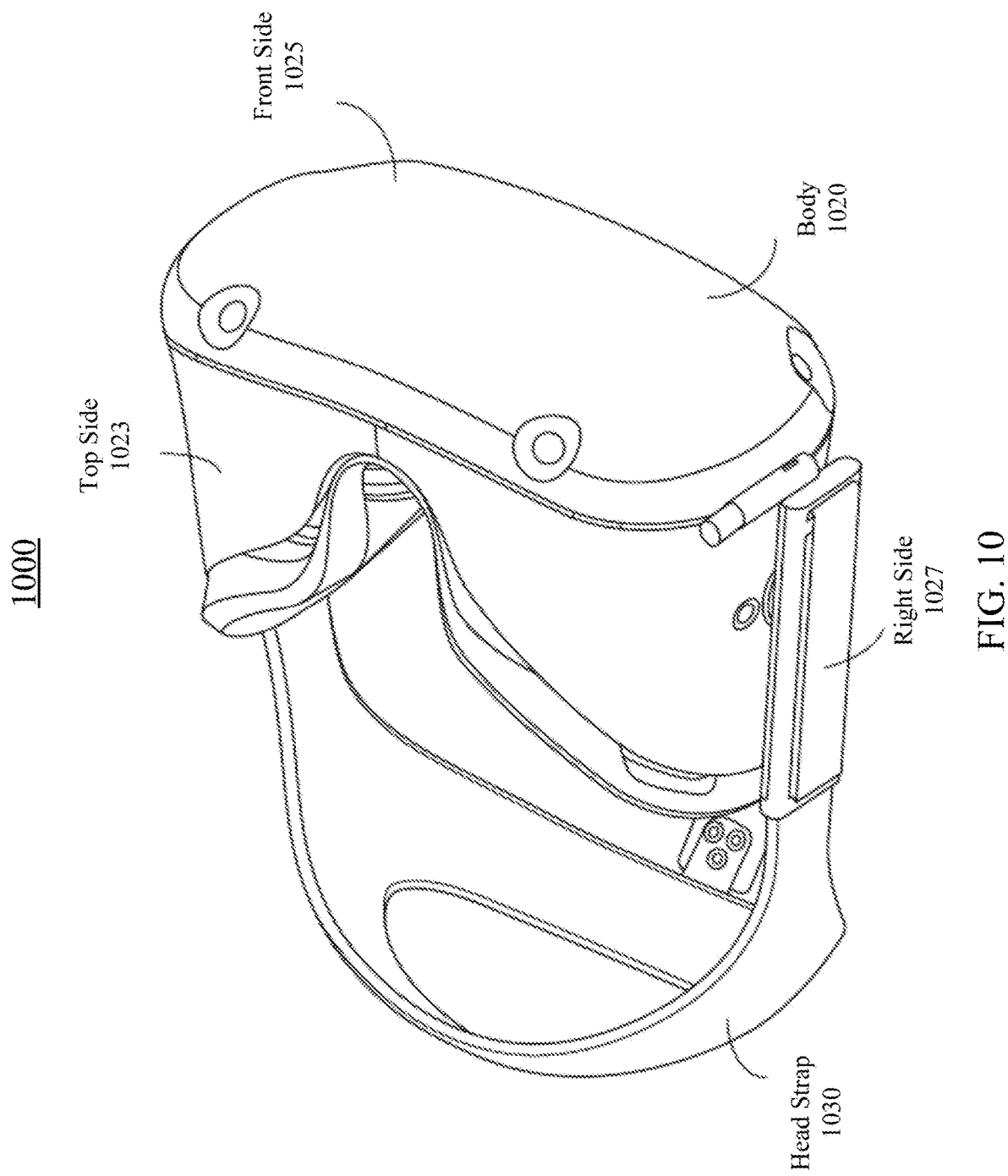
FIG. 10 is a perspective view of an example near-eye display in the form of a head-mounted display (HMD) device for implementing some of the examples disclosed herein.

FIG. 10 is a perspective view of an example near-eye display in the form of a head-mounted display (HMD) device 1000 for implementing some of the example near-eye displays (e.g., near-eye display 120) disclosed herein. HMD device 1000 may be a part of, e.g., a virtual reality (VR) system, an augmented reality (AR) system, a mixed reality (MR) system, or some combinations thereof. HMD device 1000 may include a body 1020 and a head strap 1030. FIG. 10 shows a top side 1023, a front side 1025, and a right side 1027 of body 1020 in the perspective view. Head strap 1030 may have an adjustable or extendible length. There may be a sufficient space between body 1020 and head strap 1030 of HMD device 1000 for allowing a user to mount HMD device 1000 onto the user's head. In various embodiments, HMD device 1000 may include additional, fewer, or different components. For example, in some embodiments, HMD device 1000 may include eyeglass temples and temples tips as shown in, for example, FIGS. 2-4, rather than head strap 1030.

HMD device 1000 may present to a user media including virtual and/or augmented views of a physical, real-world environment with computer-generated elements. Examples of the media presented by HMD device 1000 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 10) enclosed in body 1020 of HMD device 1000. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro-LED display, an active-matrix organic light emitting diode (AMOLED) display, a transparent organic light emitting diode (TOLED) display, some other display, or some combinations thereof. HMD device 1000 may include two eye box regions.

In some implementations, HMD device 1000 may include various sensors (not shown), such as depth sensors, motion sensors, position sensors, and eye tracking sensors. Some of these sensors may use a structured light pattern for sensing. In some implementations, HMD device 1000 may include an input/output interface for communicating with a console. In some implementations, HMD device 1000 may include a virtual reality engine (not shown) that can execute applications within HMD device 1000 and receive depth information, position information, acceleration information, velocity information, predicted future positions, or some combination thereof of HMD device 1000 from the various sensors. In some implementations, the information received by the virtual reality engine may be used for producing a signal (e.g., display instructions) to the one or more display assemblies. In some implementations, HMD device 1000 may include locators (not shown, such as locators 126) located in fixed positions on body 1020 relative to one another and relative to a reference point. Each of the locators may emit light that is detectable by an external imaging device.

Figure 11:
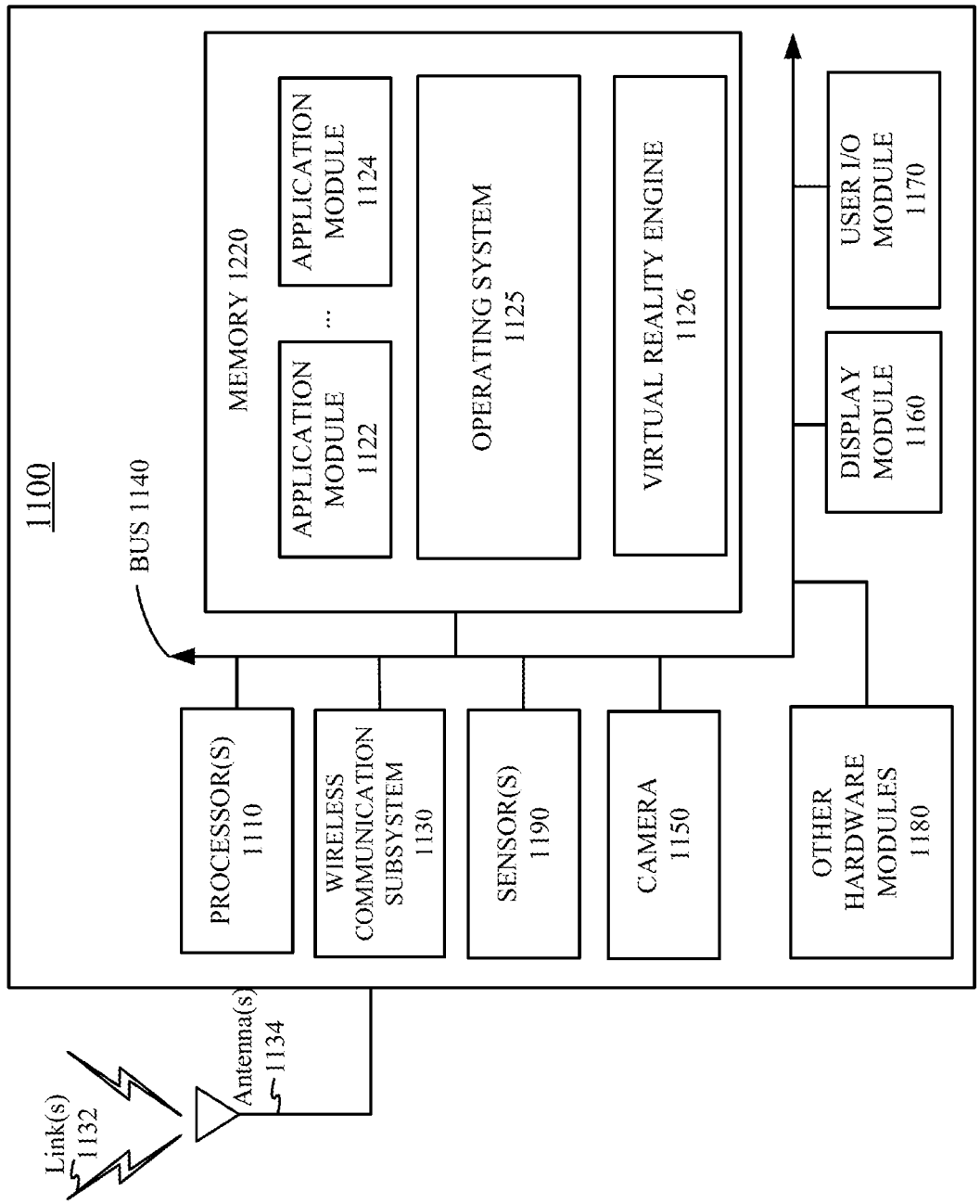
FIG. 11 is a simplified block diagram of an example electronic system of an example near-eye display for implementing some of the examples disclosed herein.

FIG. 11 is a simplified block diagram of an example electronic system 1100 of an example near-eye display (e.g., HMD device) for implementing some of the examples disclosed herein. Electronic system 1100 may be used as the electronic system of HMD device 1000 or other near-eye displays described above. In this example, electronic system 1100 may include one or more processor(s) 1110 and a memory 1120. Processor(s) 1110 may be configured to execute instructions for performing operations at a number of components, and can be, for example, a general-purpose processor or microprocessor suitable for implementation within a portable electronic device. Processor(s) 1110 may be communicatively coupled with a plurality of components within electronic system 1100. To realize this communicative coupling, processor(s) 1110 may communicate with the other illustrated components across a bus 1140. Bus 1140 may be any subsystem adapted to transfer data within electronic system 1100. Bus 1140 may include a plurality of computer buses and additional circuitry to transfer data.

Memory 1120 may be coupled to processor(s) 1110. In some embodiments, memory 1120 may offer both short-term and long-term storage and may be divided into several units. Memory 1120 may be volatile, such as static random access memory (SRAM) and/or dynamic random access memory (DRAM) and/or non-volatile, such as read-only memory (ROM), flash memory, and the like. Furthermore, memory 1120 may include removable storage devices, such as secure digital (SD) cards. Memory 1120 may provide storage of computer-readable instructions, data structures, program modules, and other data for electronic system 1100. In some embodiments, memory 1120 may be distributed into different hardware modules. A set of instructions and/or code might be stored on memory 1120. The instructions might take the form of executable code that may be executable by electronic system 1100, and/or might take the form of source and/or installable code, which, upon compilation and/or installation on electronic system 1100 (e.g., using any of a variety of generally available compilers, installation programs, compression/decompression utilities, etc.), may take the form of executable code.

In some embodiments, memory 1120 may store a plurality of application modules 1122 through 1124, which may include any number of applications. Examples of applications may include gaming applications, conferencing applications, video playback applications, or other suitable applications. The applications may include a depth sensing function or eye tracking function. Application modules 1122-1124 may include particular instructions to be executed by processor(s) 1110. In some embodiments, certain applications or parts of application modules 1122-1124 may be executable by other hardware modules 1180. In certain embodiments, memory 1120 may additionally include secure memory, which may include additional security controls to prevent copying or other unauthorized access to secure information.

In some embodiments, memory 1120 may include an operating system 1125 loaded therein. Operating system 1125 may be operable to initiate the execution of the instructions provided by application modules 1122-1124 and/or manage other hardware modules 1180 as well as interfaces with a wireless communication subsystem 1130 which may include one or more wireless transceivers. Operating system 1125 may be adapted to perform other operations across the components of electronic system 1100 including threading, resource management, data storage control and other similar functionality.

Wireless communication subsystem 1130 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1100 may include one or more antennas 1134 for wireless communication as part of wireless communication subsystem 1130 or as a separate component coupled to any portion of the system. Depending on desired functionality, wireless communication subsystem 1130 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1130 may permit data to be exchanged with a network, other computer systems, and/or any other devices described herein. Wireless communication subsystem 1130 may include a means for transmitting or receiving data, such as identifiers of HMD devices, position data, a geographic map, a heat map, photos, or videos, using antenna(s) 1134 and wireless link(s) 1132. Wireless communication subsystem 1130, processor(s) 1110, and memory 1120 may together comprise at least a part of one or more of a means for performing some functions disclosed herein.

Embodiments of electronic system 1100 may also include one or more sensors 1190. Sensor(s) 1190 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1190 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1100 may include a display module 1160. Display module 1160 may be a near-eye display, and may graphically present information, such as images, videos, and various instructions, from electronic system 1100 to a user. Such information may be derived from one or more application modules 1122-1124, virtual reality engine 1126, one or more other hardware modules 1180, a combination thereof, or any other suitable means for resolving graphical content for the user (e.g., by operating system 1125). Display module 1160 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1100 may include a user input/output module 1170. User input/output module 1170 may allow a user to send action requests to electronic system 1100. An action request may be a request to perform a particular action. For example, an action request may be to start or end an application or to perform a particular action within the application. User input/output module 1170 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1100. In some embodiments, user input/output module 1170 may provide haptic feedback to the user in accordance with instructions received from electronic system

1100. For example, the haptic feedback may be provided when an action request is received or has been performed.

Electronic system 1100 may include a camera 1150 that may be used to take photos or videos of a user, for example, for tracking the user's eye position. Camera 1150 may also be used to take photos or videos of the environment, for example, for VR, AR, or MR applications. Camera 1150 may include, for example, a complementary metal-oxide-semiconductor (CMOS) image sensor with a few millions or tens of millions of pixels. In some implementations, camera 1150 may include two or more cameras that may be used to capture 3-D images.

In some embodiments, electronic system 1100 may include a plurality of other hardware modules 1180. Each of other hardware modules 1180 may be a physical module within electronic system 1100. While each of other hardware modules 1180 may be permanently configured as a structure, some of other hardware modules 1180 may be temporarily configured to perform specific functions or temporarily activated. Examples of other hardware modules 1180 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1180 may be implemented in software.

In some embodiments, memory 1120 of electronic system 1100 may also store a virtual reality engine 1126. Virtual reality engine 1126 may execute applications within electronic system 1100 and receive position information, acceleration information, velocity information, predicted future positions, or some combination thereof of the HMD device from the various sensors. In some embodiments, the information received by virtual reality engine 1126 may be used for producing a signal (e.g., display instructions) to display module 1160. For example, if the received information indicates that the user has looked to the left, virtual reality engine 1126 may generate content for the HMD device that mirrors the user's movement in a virtual environment. Additionally, virtual reality engine 1126 may perform an action within an application in response to an action request received from user input/output module 1170 and provide feedback to the user. The provided feedback may be visual, audible, or haptic feedback. In some implementations, processor(s) 1110 may include one or more GPUs that may execute virtual reality engine 1126.

In various implementations, the above-described hardware and modules may be implemented on a single device or on multiple devices that can communicate with one another using wired or wireless connections. For example, in some implementations, some components or modules, such as GPUs, virtual reality engine 1126, and applications (e.g., tracking application), may be implemented on a console separate from the head-mounted display device. In some implementations, one console may be connected to or support more than one HMD.

In alternative configurations, different and/or additional components may be included in electronic system 1100. Similarly, functionality of one or more of the components can be distributed among the components in a manner different from the manner described above. For example, in some embodiments, electronic system 1100 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH- EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An illuminator for eye tracking comprising:
a substrate transparent to visible light and configured to be placed in front of an eye of a user;
a plurality of light sources positioned sparsely in or on a surface of the substrate and configured to emit infrared light for eye tracking; and
a plurality of beam diverting components that are spaced apart from each other and are placed sparsely on the substrate or the plurality of light sources in a field of view of the eye of the user, wherein:
each beam diverting component of the plurality of beam diverting components corresponds to one respective light source of the plurality of light sources, and is configured to direct the infrared light from the respective light source of the plurality of light sources to a different respective direction toward the eye of the user, and
for each light source of the plurality of light sources:
the light source is configured to be positioned within the field of view of the eye of the user, and
a maximum dimension of the light source in a plane parallel to an emission surface of the light source is less than 500 nm.

2. The illuminator of claim 1, wherein, for each light source of the plurality of light sources, an angle of an emission cone of the infrared light from the light source is less than 30°.

3. The illuminator of claim 1, wherein each beam diverting component of the plurality of beam diverting components includes a micro-prism, an inverse micro-prism, a grating, or an inclined plane.

4. The illuminator of claim 1, further comprising an encapsulation layer that surrounds each light source of the plurality of light sources, wherein a refractive index of the encapsulation layer matches a refractive index of the substrate.

5. The illuminator of claim 1, wherein:
the substrate comprises a conductive trace, and
for each light source of the plurality of light sources, the light source comprises an electrode that is electrically connected to the conductive trace.

6. The illuminator of claim 1, further comprising a metal-loaded conductive adhesive that bonds each light source of the plurality of light sources to the substrate.

7. The illuminator of claim 1, wherein the surface of the substrate is flat.

8. The illuminator of claim 1, wherein the substrate comprises at least one of glass, quartz, plastic, polymer, ceramic, or crystal.

9. The illuminator of claim 1, wherein each beam diverting component of the plurality of beam diverting components is configured to direct the infrared light from the respective light source of the plurality of light sources to a different respective area of the eye of the user.

10. The illuminator of claim 1, wherein:
each beam diverting component of the plurality of beam diverting components includes an inclined plane; and
each light source of the plurality of light sources is positioned on the inclined plane of a respective beam diverting component.

11. An eye-tracking unit for a near-eye display device, the eye-tracking unit comprising:
- a substrate transparent to visible light and configured to be placed in front of an eye of a user;
- a plurality of light sources positioned sparsely in or on a surface of the substrate and configured to emit infrared light for eye tracking;
- a plurality of beam diverting components that are spaced apart from each other and are placed sparsely on the substrate or the plurality of light sources in a field of view of the eye of the user, wherein each beam diverting component of the plurality of beam diverting components corresponds to one respective light source of the plurality of light sources, and is configured to direct the infrared light from the respective light source of the plurality of light sources to a different respective direction toward the eye of the user; and
- a camera configured to receive the infrared light from the plurality of light sources that is reflected by the eye of the user,
- wherein, for each light source of the plurality of light sources:
  - the light source is configured to be positioned within the field of view of the eye of the user, and
  - a maximum dimension of the light source in a plane parallel to an emission surface of the light source is less than 500 µm.

12. The eye-tracking unit of claim 11, wherein, for each light source of the plurality of light sources, an angle of an emission cone of the infrared light from the light source is less than 30°.

13. The eye-tracking unit of claim 11, wherein each beam diverting component of the plurality of beam diverting components includes a micro-prism, an inverse micro-prism, a grating, or an inclined plane.

14. The eye-tracking unit of claim 11, further comprising an encapsulation layer that surrounds each light source of the plurality of light sources, wherein a refractive index of the encapsulation layer matches a refractive index of the substrate.

15. The eye-tracking unit of claim 11, wherein:
- the substrate comprises a conductive trace, and
- for each light source of the plurality of light sources, the light source comprises an electrode that is electrically connected to the conductive trace.

16. The eye-tracking unit of claim 11, further comprising a metal-loaded conductive adhesive that bonds each light source of the plurality of light sources to the substrate.

17. The eye-tracking unit of claim 11, wherein the surface of the substrate is flat.

18. The eye-tracking unit of claim 11, wherein the substrate comprises at least one of glass, quartz, plastic, polymer, ceramic, or crystal.

19. A method of tracking an eye of a user of a near-eye display, the method comprising:
- emitting infrared light by a plurality of light sources positioned sparsely on a transparent substrate within a field of view of the eye of the user, wherein, for each light source of the plurality of light sources, a maximum dimension of the light source in a plane parallel to an emission surface of the light source is less than 500 µm;
- directing, by each beam diverting component of a plurality of beam diverting components that are spaced apart from each other and are placed sparsely on the transparent substrate or the plurality of light sources in a field of view of the eye of the user, the infrared light from a respective light source of the plurality of light sources to a different respective direction toward the eye of the user, wherein each beam diverting component of the plurality of beam diverting components corresponds to one light source of the plurality of light sources; and
- receiving, by a camera, the infrared light from the plurality of light sources and reflected by the eye of the user.

20. The method of claim 19, further comprising:
- generating, by the camera using the received infrared light reflected by the eye of the user, an image frame comprising an image of the plurality of light sources reflected by the eye of the user.

\* \* \* \* \*